(12) United States Patent
Galati et al.

(10) Patent No.: US 12,270,695 B2
(45) Date of Patent: Apr. 8, 2025

(54) CAPACITIVE FUEL GAGING SYSTEM WITH RESISTIVE ELEMENTS

(71) Applicant: Parker-Hannifin Corporation, Cleveland, OH (US)

(72) Inventors: Gary Galati, Ronkonkoma, NY (US); Robert Benward, Hauppauge, NY (US)

(73) Assignee: Parker-Hannifin Corporation, Cleveland, OH (US)

( * ) Notice: Subject to any disclaimer, the term of this patent is extended or adjusted under 35 U.S.C. 154(b) by 797 days.

(21) Appl. No.: 17/501,042

(22) Filed: Oct. 14, 2021

(65) Prior Publication Data

US 2022/0120599 A1   Apr. 21, 2022

Related U.S. Application Data

(60) Provisional application No. 63/093,335, filed on Oct. 19, 2020.

(51) Int. Cl.
*G01F 23/263* (2022.01)

(52) U.S. Cl.
CPC .......... *G01F 23/266* (2013.01); *G01F 23/268* (2013.01)

(58) Field of Classification Search
CPC .... G01F 23/266; G01F 23/268; G01F 23/263; G01F 23/248; G01N 27/129; G01N 27/22; G01N 27/228; G01N 29/2406; G01R 27/26
USPC ................................ 73/304 C, 1.73
See application file for complete search history.

(56) References Cited

U.S. PATENT DOCUMENTS

| | | | |
|---|---|---|---|
| 9,109,940 B2 | 8/2015 | Bahorich et al. | |
| 9,255,831 B2 | 2/2016 | Duan | |
| 9,299,471 B1 | 3/2016 | Robb et al. | |
| 2014/0331763 A1 | 11/2014 | Robb et al. | |

FOREIGN PATENT DOCUMENTS

| | | | |
|---|---|---|---|
| CN | 201697691 U | 1/2011 | |
| DE | 4312236 A1 * | 10/1993 | ........... F02D 19/084 |

* cited by examiner

*Primary Examiner* — John Fitzgerald
*Assistant Examiner* — Truong D Phan
(74) *Attorney, Agent, or Firm* — Renner, Otto, Boisselle & Sklar, LLP

(57) ABSTRACT

A fuel gaging system, such as may be used in determining an amount of fuel in an aircraft fuel system, includes a capacitance probe and a capacitance measurement circuit component including high resistance elements. The capacitance measurement circuit component includes a first excitation generator, an excitation wire connected between the first excitation generator and the capacitance probe, and a signal wire connected to the capacitance probe with the capacitance probe being connected between the excitation wire and the signal wire, wherein the first excitation generator generates an input signal applied to the excitation wire and an output signal is read from the signal wire to determine a capacitance at the capacitance probe. The system further includes a wire resistance measurement circuit component configured to isolate a contamination resistance to account for variations in wire resistance of the system wires in determining the capacitance at the capacitance probe; and a contamination compensation circuit component configured to compensate for fuel contamination in determining the capacitance at the capacitance probe by compensating for a slope error in the output signal.

20 Claims, 4 Drawing Sheets

CAPACITIVE FUEL GAGING SYSTEM WITH RESISTIVE ELEMENTS

RELATED APPLICATIONS

This application claims priority of U.S. Application No. 63/093,335, filed Oct. 19, 2020, the contents of which are hereby incorporated by reference.

FIELD OF INVENTION

The present invention relates generally to fuel systems including aircraft fuel systems, and more particularly to capacitive gaging systems for gaging the quantity of fuel in the fuel tanks of such systems.

BACKGROUND

Fuel quantity indicating systems (FQIS) are employed in aircraft and other fuel systems for gaging the quantity of fuel in the fuel tanks. With the introduction of composite materials in aircraft manufacturing, there is an increased threat of the introduction of electricity into the fuel tanks, such as by lightning strikes. Accordingly, for safety concerns FQIS gaging arrangements are designed for minimizing the risk of electrical conduction into the fuel tanks. Techniques to minimize electrical conduction include, for example, the use of additive electrical conduction suppression components, optical pressure gaging, high resistance wires or standard wires using high resistance safety resistors in the gaging system.

One common category of conventional gaging systems utilizes concentric probes to produce a variable capacitor probe dependent on a change of the dielectric coverage within the tube formed by the concentric probes. The probe capacitor dielectric is a combination of air space and the fuel level, providing a quasi-direct indication of fuel height. The concentric probes form a simple capacitor, and the gauging system further may include a shielded and an unshielded wire running to the probe. Both wires exhibit transmission line qualities, and the shielded line will have higher unit capacitance per foot than the unshielded wire, but the unshielded wire will exhibit somewhere around 10-20 pf/m (air/fuel) as it travels in proximity to the fuel tank walls. High resistance wires will exhibit these same transmission line characteristics albeit with a higher resistance and much higher impedance. The use of capacitive gaging with high resistance wires does not require substantial electronics to be located in the fuel tank and otherwise minimizes the risk of electrical conduction into the fuel tank. As an alternative to high resistance wires, other high resistance elements, such as for example standard wires with safety resistors or other electrical suppression elements, may be employed to achieve electrical safety in combination with the wiring being used for capacitive fuel gaging. The use of high resistance elements for electrical safety, however, whether configured as standard wires with safety resistors or high resistance wires, can negatively impact system accuracy with respect to fuel gaging.

Contamination associated with the fuel probe constitutes a potential error source in capacitive gaging. Contamination typically occurs in two places: first, on the terminal board for the probe interface, and second, in the fuel itself, either as water or other contaminant that unintentionally enters the fuel, or as an intentionally introduced antistatic compound or other fuel additive, which also may employ the use of environmentally renewable fuel components such as sustainable aviation fuel (SAF). Newer generation probes utilize sealed connectors that incorporate D38999 industry standard contacts, cork and bottle facial sealing, and concentric wire sealing rings. These features largely eliminate contamination at the probe interface, which leaves fuel contamination, whether by unintentional contamination or the intentional introduction of fuel additives, as the principal source of error in capacitive fuel gaging.

Conventional capacitive gaging systems utilize an excitation generator that generates a triangle wave excitation that flows through a first high-resistance element with a constant voltage/time (dV/dT) slope. The triangle wave excitation is differentiated by the probe capacitor. The differentiation produces a square wave output through a second high-resistance element, and the square wave peak to peak amplitude is then sampled and related to the amount of fuel in the tank. The frequency of excitation typically is in the proximity of 1 KHz. Generally, to avoid cross talk between channels in a dual channel architecture, a 24 Hz separation may be used. Contamination in the fuel affects the efficacy of the square wave output from the differentiation of the triangle excitation, introducing a "saw-tooth" or sloped error component into the square wave output that must be accounted for to obtain accurate fuel gaging. This effect becomes more significant with the increased resistance of the high-resistance wires in the gaging system, or other high resistance elements in the gaging system such as standard wires with safety resistors, to minimize electrical conduction into the fuel tank. Comparable principals apply to other suitable excitation waveforms that may be employed, such as for example a sine wave excitation waveform. With such alternative excitation waveforms as well, contamination in the fuel affects the efficacy of the output waveform from the differentiation of the excitation waveform.

More particularly, as an example a length of run for fuel gaging in an exemplary aircraft currently may be approximately fifty feet (or approximately 15 meters). This roughly correlates to 2 MΩ for each of the high-resistance wires, and at such resistance levels contamination may have a significant effect on the capacitance measurement at the probe and must be measured and compensated. The inventors have found through simulations using these conditions that the RC time constant of the capacitive probing system changes with contamination, and thus the settling time now occupies a significant portion of the differentiated triangle excitation outputted from the capacitive probe. The RC time constant changes significantly such that sampling of the differentiated triangle excitation (square wave output) is no longer possible, as the RC output does not settle out within the desired sampling time. In addition, when reducing the excitation frequency to compensate for the extended RC time constant, a reduced capacitance output results, degrading the signal to contamination ratio which renders an accurate capacitance determination difficult.

SUMMARY OF INVENTION

There is a need in the art, therefore, for an enhanced capacitive fuel gaging system, particularly suitable for use in an aircraft fuel system, that uses high-resistance elements to minimize electrical conduction into the fuel tanks (such as for example by lightning strikes), while also compensating for fuel contamination (whether by unintentional contaminants such as water or intentional fuel additives). In exemplary embodiments, a conventional capacitance measurement system such as described above is modified to incorporate additional components that implement a high-resistance wire measurement mode and a gaging mode that includes contamination compensation. The high-resistance wire measurement mode may be employed using any suitable configuration to provide the requisite high resistance, such as for example standard wires combined with high resistance safety resistors, high resistance wires, or other suitable high resistance elements. For purposes of the description below, all such configurations are encompassed by general references such to such parameters as wire resistance, resistance wires, and the like.

The amount of slope error introduced into the conventional square wave output signal is a function of the contamination resistance and the high-resistance excitation element in series. Accordingly, additional components of the system include a static direct current (DC) voltage source (which may be a 50V DC source) that supplies a DC source voltage, and analog switches to switch the DC source connection and to switch out fixed and variable excitation sources. In an exemplary embodiment, the DC source voltage is passed through an additional sensing resistance. The use of the additional sensing resistance element permits differential measurement of the wire resistance plus contamination resistance versus resistance of the resistance element alone to isolate the contamination resistance. The differential measurement also takes into account variations in resistance with temperature and over the life of the resistance elements. In another exemplary embodiment, a probe mounted diode is employed to extract the contamination resistance from the resistance of the excitation element. The use of the probe mounted diode also permits differential measurement of the wire resistance plus contamination resistance versus wire resistance alone to isolate the contamination resistance. The differential measurement also takes into account variations in wire resistance with temperature and over the life use of the resistance elements. In addition, a second compensation excitation generator is added to the conventional system so as to generate for compensation a variable excitation waveform to eliminate the slope error caused by the fuel contamination.

A method of gaging fuel in a capacitance fuel gaging system includes a wire measurement mode, followed by a probe measurement gaging mode. The wire measurement mode measures the wire resistance and the contamination resistance to account for variations in the wire resistance that can affect the measured capacitance. The probe measurement gaging mode measures the slope error in the output waveform that results from the contamination and removes this slope error from the output waveform. This "de-sloping" action occurs continuously. Once de-sloped, the output waveform is sampled and converted to a digital value. The gaging mode measurement is continuous throughout the aircraft operation, and the wire resistance measurement is performed only periodically at a suitable interval relative to potential variations in wire resistance.

Regarding the wire measurement mode, as the wire resistance varies with use and temperature, the slope error introduced into the differentiated excitation waveform (e.g., output square wave for the example of a triangular excitation) for a given contamination will also change. Thus, a change in the wire resistance for a given contamination cannot be distinguished from a change in contamination. To overcome this ambiguity, the additional sensing wire or probe diode is employed to accurately measure the wire resistance, which is used to compensate for resistance variations over time and temperature. A differential resistance measurement is obtained based on a difference between a resistance measurement of the wire and contamination resistances in combination and the wire resistance by itself. Using this differential resistance measurement isolates the contamination resistance to compensate for variations in wire resistance such that the contamination can be measured directly. Such operation constitutes a direct approach to measure the resistances and thus is more robust than attempting to compensate the contamination output for wire resistance changes over temperature and time. This also eliminates installation issues whereby the wire characteristics must be recorded and entered into software to make up for varying installation lengths.

Regarding the probe measurement gaging mode, as referenced above, contamination produces a slope error in the square wave output signal that is corrected by the system and method of the current disclosure. The measurement of the output waveform that includes the slope error is a direct indication of the level of contamination for all values of probe capacitance, assuming a fixed resistance for the wire. A compensation output waveform is determined as the integral of the sampled 25% and 75% points of the sloped output from the probe. Any DC difference between these two points is integrated, producing a continuously rising DC voltage, referred to herein as the contamination current. This contamination current is applied to a second compensation excitation generator that creates a triangle voltage 180° out of phase with the probe excitation from the first excitation generator, and whose amplitude is based on the voltage associated with the contamination current. Due to the rising DC voltage of the contamination current, the compensation excitation from the compensation excitation generator will also continue to rise until the compensation excitation completely cancels the contamination current, flattening the slope of the output square wave. Once the square wave is de-sloped, the integration stops and the DC voltage is static, and both the output voltage and the capacitance value can be accurately measured. As contamination will divert some of the excitation current around the probe capacitance, even when flattened, a lower amplitude square wave output will result. A simple look up table or a correction calculation may be used to compensate the measured capacitance to correct for the amplitude reduction.

Accordingly, once the contamination resistance is isolated from the wire measurement mode, and the slope correction flattens the square wave for capacitance measurement during the probe measurement gaging mode, the measured capacitance is obtained and then corrected via entry into a look-up table or by other suitable calculation. In particular, utilizing the contamination resistance and the measured capacitance value, a multiplier factor is obtained from the look-up table or calculation and is used to compensate the measured capacitance value into a final capacitance value, which in turn is associated with fuel gaging as to the amount of fuel in the fuel tank.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Figure 1:
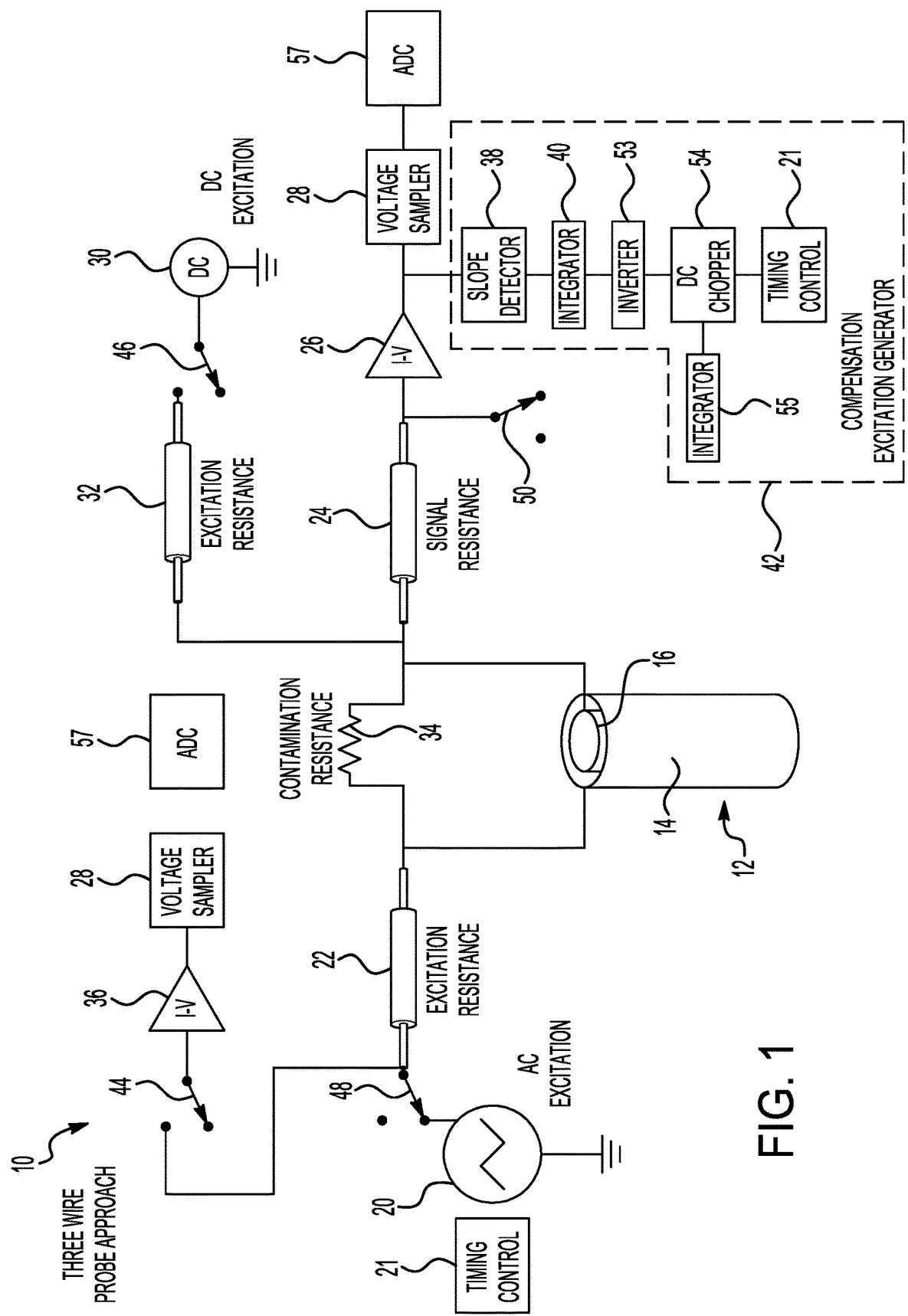
FIG. 1 is a drawing depicting an exemplary fuel gaging system in accordance with embodiments of the present application, employing a three-wire configuration with a capacitance probe.

Embodiments of the present application will now be described with reference to the drawings, wherein like reference numerals are used to refer to like elements throughout. It will be understood that the figures are not necessarily to scale.

The present disclosure describes an enhanced capacitive fuel gaging system and related gaging methods that use high resistance elements to minimize electrical conduction into the fuel tanks (such as for example by lightning strikes), while also compensating for fuel contamination. FIG. 1 is a drawing depicting an exemplary fuel gaging system 10 in accordance with embodiments of the present application, employing a three-wire configuration with a capacitance probe. The fuel gaging system 10 includes a capacitance probe 12 that is formed of a concentric outer probe 14 and an inner probe 16. Similarly as in conventional configurations, the concentric probes 14 and 16 that form the capacitance probe 12 constitute a variable capacitor probe dependent on a change of the dielectric coverage within a tube area formed between the concentric probes. The capacitance probe dielectric is a combination of air space and the fuel level within the tube area, providing a quasi-direct indication of fuel height for gaging the amount of fuel in the tank.

The fuel gaging system 10 further includes a first excitation generator 20 that generates an excitation waveform that is inputted to the capacitance probe 12 via a first or excitation high resistance element 22. The application of the excitation waveform is controlled in accordance with a timing signal from a clock 21. As referenced above, in accordance with requisite safety considerations, a suitable resistance for use in an aircraft capacitance gaging system is up to approximately 2 MΩ. In response to the excitation waveform, the capacitance probe outputs an output waveform through a second or signal high resistance element 24, which also may be up to approximately 2 MΩ. The second resistance element also may be referred to as a return resistance element. As referenced above, the first and second high resistance elements 22 and 24 may have any suitable configuration to provide the requisite high resistance, such as for example standard wires combined with high resistance safety resistors, high resistance wires, or other suitable high resistance elements. For purposes of the description below, all such configurations are encompassed by general references to parameters such as wire resistance, resistance wires, and the like.

Similarly as in conventional systems described above, the excitation generator 20 generates an excitation waveform, such as for example a triangle wave excitation waveform (or other suitable waveform such as a sine waveform), that is inputted through the excitation resistance wire 22 to the capacitance probe 12. The excitation waveform has a constant voltage/time (dV/dT) slope, which is differentiated by the capacitance probe 12. The differentiation produces a square wave output signal through the signal resistance wire 24, and the square wave peak to peak amplitude is then sampled and related to the amount of fuel in the tank. More specifically, the output waveform from the signal resistance wire 24 is inputted into a first current-voltage (I-V) converter 26. The output voltage from the I-V converter 26 is sampled by an amplitude voltage sampler 28 and processed through an analog-to-digital converter (ADC) 57 to determine a measured capacitance at the capacitance probe 12, which in turn is converted into a gaging determination corresponding to a fuel amount in a fuel tank being measured as is known in the art.

The components described above essentially constitute a typical or conventional capacitance fuel gaging system. As detailed above, contamination in the fuel affects the efficacy of the square wave output signal from the differentiation of the triangle excitation, introducing a "saw-tooth" or sloped error component into the square wave output signal that must be accounted for to obtain accurate fuel gaging. This effect becomes more significant with increasing the resistance of the high resistance elements in the gaging system to minimize electrical conduction into the fuel tank. At a resistance level corresponding to the example of about 2 MΩ resistance elements referenced above, the slope error introduced by contamination indeed may be sufficiently significant to require compensation.

To accommodate the high resistance elements used in embodiments of the current application, an initial adjustment is to change the frequency of the excitation waveform relative to the conventional system described in the background section above. The change of frequency ensures the RC output has settled out sufficiently to permit an adequate sampling time. In an exemplary embodiment, the inventors have found to be suitable an excitation frequency of 20 Hz, which permits a 25 ms sampling window. The maximum RC time constant is 2*2 MΩ*500 pF=2 ms. For the RC output to settle to less than 0.1%, seven periods are utilized spanning 14 ms, leaving 11 ms for sampling. As the frequency of the excitation waveform changes, so does the voltage slope and thus the output voltage of the excitation waveform. The referenced modification from the conventional 1 kHz to 20 Hz is a 50:1 change, and thus a corresponding output voltage change occurs. To compensate, a 100 Vpk-pk is used, modified from a conventional 20 Vpk-pk, to increase the waveform slope (dV/dT). The increased voltage to 100 Vpk-pk increases the safety risk, and additional internal resistances may be employed within the fuel system computer to ensure intrinsically safe conditions are met. The overall result is to increase the available capacitance output voltage, which improves the signal to contamination to noise ratio.

In addition to the modification of the excitation voltage as compared to conventional configurations, the conventional capacitance measurement system is modified to incorporate additional components that implement a high resistance measurement mode and a gaging mode that includes contamination compensation. The amount of slope error introduced into the conventional square wave output signal is a function of the contamination resistance and the high resistance excitation element in series. Accordingly, additional components of the system in the embodiment of FIG. 1 include a static direct current (DC) voltage source (which may be a 50V DC source) that supplies a DC source voltage through an additional sensing wire, and analog switches to switch the DC source connection and to switch out fixed and variable excitation sources. The use of the additional sensing wire permits differential measurement of the wire resistance plus contamination resistance relative to the wire resistance alone, to isolate the contamination resistance to account for variations in wire resistance with temperature and over the life use of the wires. In addition, a second compensation excitation generator is added to the conventional system so as to generate for compensation a variable excitation waveform to eliminate the slope error caused by the fuel contamination.

A method of gaging fuel in a capacitance fuel gaging system thus includes a wire measurement mode, followed by a probe measurement gaging mode in which contamination compensation is performed. The wire measurement mode measures the wire resistance and the contamination resistance to account for variations in the wire resistance that can affect the measured capacitance. The probe measurement gaging mode measures the slope error in the output square waveform that results from the contamination and removes this slope error from the output waveform. This "de-sloping" action occurs continuously. Once de-sloped, the output waveform is sampled and converted to a digital value. The gaging mode measurement is continuous throughout the aircraft operation, and the wire measurement mode is performed only periodically at a suitable interval (for example every 30 seconds or other suitable interval) to account for potential variations in wire resistance.

Referring to the system diagram of FIG. 1, the fuel gaging system 10 further includes a DC voltage source 30, which in exemplary embodiments is a 50V DC source. The DC voltage source 30 supplies the DC source voltage through a third resistance element 32, also referred to as a sensing element, for sensing the wire resistance and the contamination resistance. The sensing element 32 similarly may be configured as a standard wire with high resistance safety resistors or as a high resistance wire. The contamination resistance is represented in FIG. 1 by the resistance 34, i.e., element 34 is not an electrical component of the system but rather is a representation of the resistance of any contamination in the fuel. As further detailed below, the wire resistance and contamination resistance may be measured using a measuring device 36, and the measuring device 36 may be configured as or to include a second I-V converter as shown in FIG. 1.

The fuel gaging system 10 also includes a second excitation generator 42 represented collectively by the dashed block. The second excitation generator 42 includes a slope detector 38 that samples the output signal from the signal resistance element 24 to determine the slope error in the square wave output signal. The DC output of the slope detector is applied to an integrator 40, and then to an inverter 53 where the output is converted to a plus and minus amplitude square wave by a DC chopper 54. The timing of the square wave is controlled by the timing control device 21, which is synced to the first excitation generator 20. To complete the signal conversion, the bi-directional square wave is fed to an integrator 55 such that the current output is equal in amplitude but 180 degrees out of phase with the contamination current error signal, thus eliminating the contamination error from the capacitance measurement to compensate for the slope error.

The fuel gaging system 10 further may include a switching system that selectively engages the wire resistance measurement components during the wire resistance measurement mode, and selectively engages the contamination compensation components during the gaging mode. Switching between the wire measurement mode and the probe measurement gaging mode is performed by operation of a series of switches 44, 46, 48, and 50.

Regarding the wire measurement mode, as the wire resistance varies with use time and temperature, the slope error introduced into the differentiated excitation (output square wave signal) for a given contamination will also change. Thus, a change in the wire resistance for a given contamination cannot be distinguished from a change in contamination. To overcome this ambiguity, the additional sensing wire 32 is employed to accurately compensate variations in the wire resistance over different operational conditions and use time. A differential resistance measurement is obtained based on a difference between a resistance measurement of the wire and contamination resistances in combination and the wire resistance by itself. Using this differential resistance measurement compensates for changes in wire resistance by isolating the contamination resistance such that the contamination can be measured directly. Such operation constitutes a direct approach to measure the contamination resistance and thus is more robust than attempting to compensate the contamination output for wire resistance changes over temperature and time. This also eliminates installation issues whereby the wire characteristics must be recorded and entered into software to make up for varying installation lengths.

Figure 2:
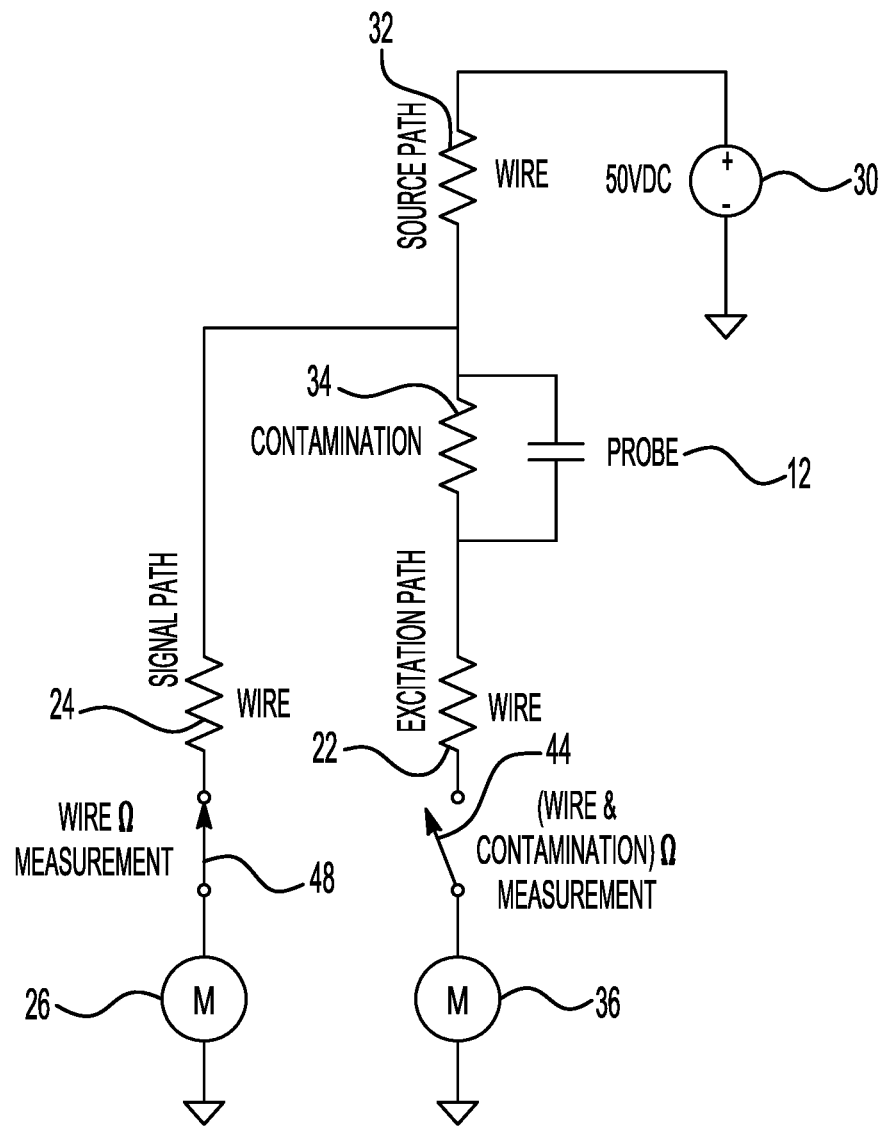
FIG. 2 is a drawing depicting fuel gaging system components of the system of FIG. 1 that are utilized in the wire measurement mode.

To perform the wire measurement mode, the system is placed in a DC operating mode by closing switch 46 to electrically connect the 50V DC voltage source 30 to the sensing wire 32. Switches 48 and 50 initially are open to isolate the two excitation generators so the system operates in a DC mode. To further demonstrate the wire measurement mode, FIG. 2 is a drawing depicting the fuel gaging system components utilized in the wire measurement mode in isolation for easier reference.

Considering FIG. 2 in combination with FIG. 1, the wire measurement mode is performed as follows. To measure the combined wire resistance and contamination resistance, switches 44 and 46 are closed. The DC voltage source 30 generates a current flow through the sensing wire 32 and through the capacitance probe 12. As such, the DC current flows through the fuel and experiences the contamination resistance 34. With the switches 44 and 46 closed, the DC source current flows through the excitation (first) resistance element 22 and to the second I-V converter 36, whereby the combined wire and contamination resistance may then be determined.

To measure the wire resistance by itself (i.e., independent of the contamination resistance), the switch 44 is opened and the switch 48 is closed. With such configuration, the DC current flows through sensing wire 32 and then directly through the signal (second) resistance element 24. In this manner, the DC source flow does not encounter the contamination resistance 34. The DC source current flows to the first I-V converter 26, whereby the wire resistance may then be determined independent of the contamination resistance. A differential calculation then is made to isolate the contamination resistance from the wire resistance, and thus any variations in the wire resistance are compensated and thus taken into account in the final capacitance measurement for fuel gaging.

Contamination resistance for fuel additives can be calculated using the wire measurement mode. For example, using a 1-meter long probe with an outer diameter of 35 mm and an inner diameter of 19 mm produces an empty probe capacitance of 90 pF, and a full probe capacitance of 197 pF. Using the conventional formula for cylindrical capacitance and substituting conductance for permittivity, one can calculate the resistance across the probe for a given fuel additive. As an example, HiTEC 4547 antistatic additive has a conductivity of 275 to 500 pS/m, and based on the manufacturer's technical report, one can expect a total conductivity of 100 to 250 pS/m when mixed at 20 mg/L in fuel. For the exemplary probe described above, this corresponds to 400 to 1000 MΩ. This would correspond to a 0.4% to 0.8% capacitance measure error (uncorrected). For highly accurate fuel gaging systems, an accuracy of +/−0.5 pf for probes and +/−0.25 pf for compensators is required. A 0.4% to 0.8% capacitance measure error on a typical 200 pF capacitance probe would be 0.8 pF to 1.6 pF error. On a typical 60 pF compensator would be 0.32 pF to 0.48 pF.

Figure 3:
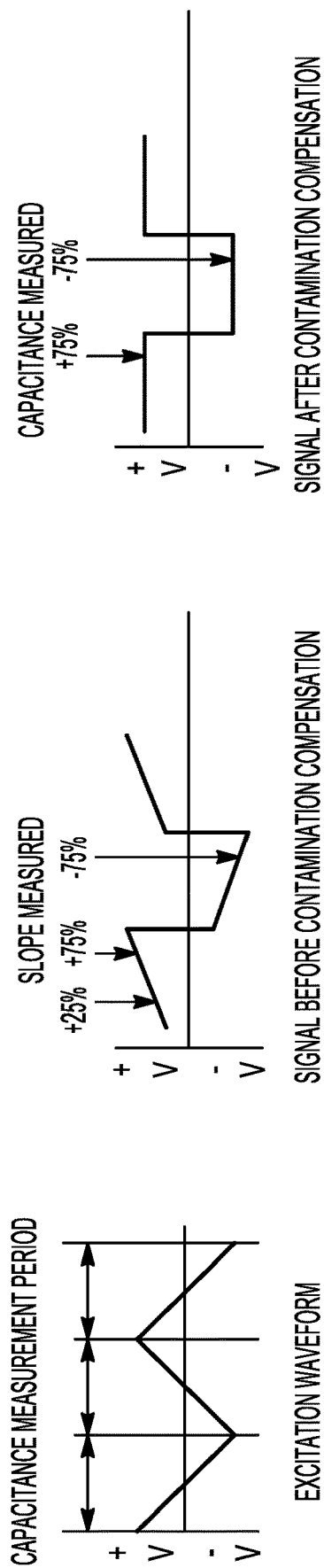
FIG. 3 is a drawing depicting a graphical depiction of contamination compensation to eliminate the slope error in the output square waveform.

Regarding the probe measurement gaging mode, as referenced above, contamination produces a slope error in the square wave output signal that is corrected by the system and method of the current disclosure. FIG. 3 is a drawing depicting a graphical depiction of contamination compensation to eliminate the slope error in the output signal square waveform. Referring to FIGS. 1 and 3 in combination, the probe measurement gaging mode is performed as follows. Initially, switches 44 and 46 are opened to electrically disconnect the DC voltage source 30 and thus preclude operation in the DC mode. Switches 48 and 50 are closed to electrically connect the two excitation generators 20 and 42, and thus FIG. 1 depicts a switching state corresponding to the gaging mode.

The left portion of FIG. 3 illustrates an exemplary triangle excitation waveform input signal that is generated by the first excitation generator 20. As the triangle excitation waveform (input signal) is generally fixed, the first excitation generator also may be referred to as a fixed excitation generator. The capacitance probe 12 operates to differentiate the excitation waveform input signal into a square wave output signal, but as shown in the middle portion of FIG. 3, a slope error is introduced by the presence of fuel contamination, which again may be due to unintentional contaminants or intentionally added fuel additives. The measurement of the output signal waveform that includes the slope error is a direct indication of the level of contamination for all values of probe capacitance, assuming a fixed resistance for the wires. The output signal waveform is inputted to the I-V converter 26, after which the slope error is compensated along a pathway that includes the slope detector 38 and the inverter 53.

In particular, in an exemplary embodiment the slope detector 38 samples the 25% and 75% points of the sloped output signal waveform, as identified in the middle portion of FIG. 3, and generates a resultant compensation output. The compensation output is generated by the slope detector 38 as the integral of the sampled 25% and 75% points of the sloped output signal waveform. Any DC difference between these two points is integrated by the slope detector 38, producing a continuously rising DC voltage. The output of the slope detector 38 is sent to the integrator 40 and inverter 53, which generates an inverse signal relative to the rising DC voltage, referred to herein as the contamination current. This contamination current from the inverter 53 is applied to the DC chopper 54 producing a bi-direction square wave waveform. The output of the DC chopper 54 is sent to the integrator 55 which creates a compensation excitation output waveform constituting a triangle current waveform 180° out of phase with the excitation waveform generated by the excitation generator 20, and whose amplitude is based on the voltage associated with the contamination current. Because the output of the second excitation generator 42 varies with the slope error caused by the contamination, the second excitation generator also may be referred to as a variable excitation generator.

Referring to FIG. 1, the compensation excitation waveform flows from the second excitation generator 42 to the I-V converter 26, which applies the compensation excitation waveform to the output signal waveform that flows from the signal (second) resistance wire 24. Due to the rising DC voltage of the contamination current, the compensation excitation waveform from the second excitation generator 42 will also continue to rise until the compensation excitation completely cancels the contamination current, flattening the slope of the output signal square waveform. The flattened or de-sloped square wave output signal is illustrated in the right portion of FIG. 3. Once the square wave output signal is de-sloped, the integration stops and the DC voltage is static. Both the output voltage and the capacitance value can be accurately measured based on the output of the amplitude voltage sampler 28. As contamination will divert some of the excitation current around the probe capacitance, even when flattened, a lower amplitude square wave output signal will result, as illustrated in the FIG. 3 portions by comparing the peak amplitudes of the middle and right portions of FIG. 3. A simple look-up table or a correction calculation may be used to apply a multiplier to compensate the measured capacitance to correct for the amplitude reduction in the compensated output signal relative to the initial output signal. Accordingly, a multiplier factor is applied to the de-sloped output signal to correct for a reduction in amplitude of the de-sloped output signal relative to the output signal from the signal wire 24.

Accordingly, once the contamination resistance is isolated from the wire measurement mode, and the slope correction flattens the square wave for capacitance measurement during the gaging mode, the measured capacitance is obtained and then corrected via entry into a look-up table. In particular, utilizing the contamination resistance and the measured capacitance value, a multiplier factor is obtained from the look-up table and is used to compensate the measured capacitance value into a final capacitance value, which in turn is associated with fuel gaging as to the amount of fuel in the fuel tank. In addition, although the compensation process has been described principally in connection with a triangular excitation waveform, comparable principles principals apply to other suitable excitation waveforms that may be employed, such as for example a sine wave excitation waveform.

The final capacitance value may be employed to determine the amount of fuel in a given fuel tank as follows. The following calculation steps may be performed by an aircraft computer system executing suitable program code store on a non-transitory computer readable medium. The system derives a fuel dielectric constant for the tank and validates such constant, and computes a "wetted" or immersed length for the capacitance probe. A fuel surface attitute is obtained from the aircraft computer system or computed using the immersed length and stored probe coordinates. A nominal volume is computed using scale factors developed using probe placement. Using the scaled nominal volume, fuel surface attitute, and weight on wheels of the aircraft, a volume correction factor is obtained from a stored polynomial based look-up table. The volume correction factor is applied to determine the actual fuel volume, and the actual fuel volume is multiplied by the measured density to determine the fuel mass. As a typical aircraft has multiple fuel tanks (e.g., center tank and wing tanks), and multiple capacitance probes may be provided in each tank, these method steps may be performed or repeated as to each probe and tank as may be warranted for any particular implementation or circumstances. In some cases, the tanks are structured or treated as including individual compartments, such as a feed tank and a main tank, in which case the computational approach outlined above may be applied to each individual tank compartment.

Figure 4:
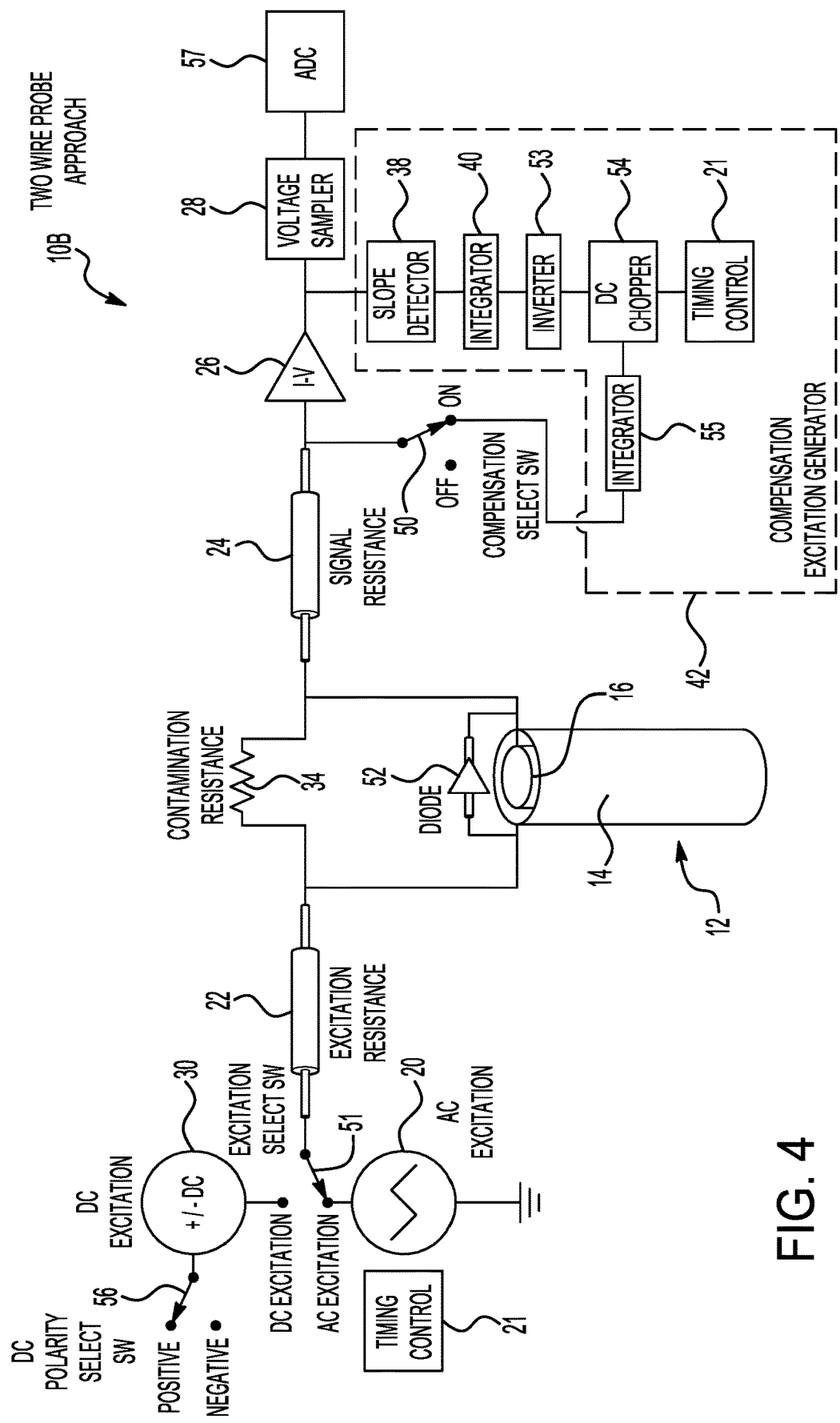
FIG. 4 is a drawing depicting another exemplary fuel gaging system in accordance with embodiments of the present application, employing a two-wire configuration with a capacitance probe including a probe diode.

FIG. 4 is a drawing depicting another exemplary fuel gaging system 10B in accordance with embodiments of the present application, employing a two-wire configuration with a capacitance probe including a probe diode. Comparing the embodiments of FIGS. 1 and 4, in general the principal difference is that in the embodiment of FIG. 4, the additional sensing element or wire 32 of the embodiment of FIG. 1 is eliminated. Instead, the fuel gaging system 10B of FIG. 4 employs a probe diode 52 as part of the capacitance probe 12, and in particular connected across the concentric probes 14 and 16 of the capacitance probe 12, to isolate the contamination resistance. For ease of illustration, like components in FIGS. 1 and 4 are identified with like reference numerals, and common elements will generally operate comparably as described above in both embodiments, except as detailed below.

Referring to FIG. 4, as referenced above the capacitance probe 12 includes the probe diode 52 connected across the concentric probes 14 and 16. The anode of the probe diode 52 is attached to the outer probe 14, and the cathode of the probe diode 52 is attached to the inner probe 16. Similarly as in the previous embodiment, the fuel gaging system 10B further includes an AC excitation generator 20 that produces an excitation waveform that drives the capacitance probe 12 via the first or excitation high resistance element 22. The frequency and amplitude of the excitation waveform is controlled in accordance with a timing signal from the clock 21. In response to the excitation waveform, the capacitance probe outputs a current waveform through a second or signal high resistance element 24. As referenced above, in accordance with requisite safety considerations, a typical excitation resistance for use in an aircraft capacitance gaging system could be as high as 2 MΩ. In addition, the excitation resistance element 22 and the signal resistance element 24 again may have any suitable configuration to provide the requisite high resistance, such as for example standard wires combined with high resistance safety resistors, high resistance wires, or other suitable high resistance elements.

The generation of the input excitation waveform to the excitation resistance element 22 and the processing of the output waveform from the signal resistance element 24 may proceed comparably as described above. Referring to FIG. 4, in general the signal flow path for capacitance measurement (and thus fuel gaging) is as follows. The excitation waveform is provided by the excitation generator 20 through the switch 51 to the excitation resistance element 22. The output waveform from the capacitance probe 12 is applied to the signal resistance element 24. The output waveform from the signal resistance element 24 then is inputted into the first current-voltage (I-V) converter 26. The output voltage from the I-V converter 26 is sampled by the amplitude voltage sampler 28 and processed through the ADC 57 to determine a measured capacitance at the capacitance probe 12, which in turn is converted into a gaging determination corresponding to a fuel amount in a fuel tank being measured as is known in the art. Also as similar to the previous embodiment, the excitation voltage may be modified as described above as compared to conventional configurations to account for the use of high resistance elements in the gaging system.

The gaging system 10B of FIG. 4 differs from the gaging system 10 of FIG. 1 in the manner by which the gaging system 10B further performs contamination compensation. As referenced above, the amount of slope error introduced into the conventional square wave output signal is a function of the contamination resistance in series with the high resistance excitation element. Accordingly, additional components of the system include the static direct current (DC) voltage source 30 (which may be a 50V DC source) that supplies a DC source voltage and the analog switch 51 that switches between a first position connecting to the DC source 30 versus a second position connecting to the excitation source 20. In the embodiment of FIG. 4, the DC voltage source is applied to the probe diode 52 when connected via the switch 51 being in the first position. The use of the probe diode 52 permits differential measurement of the wire resistance of the excitation resistance element 22, plus contamination resistance as representative by the resistance 34 relative to the wire resistance alone, to isolate the contamination resistance to account for variations in wire resistance with temperature and over the life use of the wires. Similarly as in the previous embodiment, the compensation excitation generator block 42 is added to the conventional system to generate a 180 degree out-of-phase variable excitation waveform to eliminate the slope error caused by the fuel contamination.

In the embodiment of FIG. 4, the DC voltage source 30 can be switched to output either a plus or minus DC voltage through a DC polarity select switch 56. The DC voltage source 30 supplies the DC source voltage for sensing the wire resistance and the contamination resistance. The contamination resistance again is represented in FIG. 4 by the resistance 34, i.e., element 34 is not an electrical component of the system but rather is a representation of the resistance of any contamination in the fuel. Similarly as in the previous embodiment, the fuel gaging system 10B also includes the second excitation generator 42. The second excitation generator 42 includes the slope detector 38 that samples the output signal from the signal resistance element 24 to determine the slope error in the square wave output signal. The DC output of the slope detector is applied to the integrator 40, and then to the inverter 53 where the output is converted to a plus and minus amplitude square wave by the DC chopper 54. The timing of the square wave is controlled by the timing control device 21, which is synced to the first AC excitation generator 20. To complete the signal conversion, the bi-directional square wave is fed to the integrator 55 such that the current output is equal in amplitude but 180 degrees out of phase with the contamination current error signal, thus eliminating the contamination error from the capacitance measurement.

The fuel gaging system 10B further includes a switching system that selectively engages the wire resistance measurement components during the wire resistance measurement mode, and selectively engages the contamination compensation components during the gaging mode. Switching between the wire measurement mode and the probe measurement gaging mode is performed by operation of the series of switches 50, 51 and 56. Switches 50 and 51 are switched concurrently to enter the wire measurement mode, and switch 56 changes the polarity of the DC test voltage.

Regarding the wire measurement mode, as referenced above as the wire resistance varies with use time and temperature, the slope error introduced into the differentiated excitation (output square wave signal) for a given contamination will also change. Thus, a change in the wire resistance for a given contamination cannot be distinguished from a change in contamination. To overcome this ambiguity, the probe diode 52 of the probe 12 is employed to accurately compensate variations in the wire resistance over different operational conditions and use time. A differential resistance measurement is obtained based on a difference between a resistance measurement of the wire and contamination resistances in combination and the wire resistance by itself. Using this differential resistance measurement compensates for changes in wire resistance by isolating the contamination resistance such that the contamination can be measured directly. Again, such operation constitutes a direct approach to measure the contamination resistance and thus is more robust than attempting to compensate the contamination output for wire resistance changes over temperature and time. This also eliminates installation issues whereby the wire characteristics must be recorded and entered into software to make up for varying installation lengths.

In the embodiment of FIG. 4, to perform the wire measurement mode the gaging system 10B is placed in a DC operating mode by placing switch 51 in the first position to electrically connect the 50V DC voltage source 30 to the excitation wire 22. Switch 50 is open to isolate the excitation generator so the system operates in a DC mode. The waveform diagrams of FIG. 3 can be applied comparably to the embodiment of FIG. 4 as to the embodiment of FIG. 1. To measure the combined excitation/signal wire resistance and contamination resistance, switch 51 is set for DC excitation, switch 56 is set to negative polarity, and switch 50 is open. The DC voltage source 30 generates a current flow through the excitation wire 22 and through the capacitance probe 12. No current flows through the probe diode 52 because the probe diode is reversed bias when the DC source 30 operates with negative polarity. As such, the DC current flows through the fuel and experiences the contamination resistance 34. The DC source current flows through the contamination resistance 34 and through the signal resistance element 24, which is then converted to a voltage by the I/V amplifier 26 which is used to determine the combined excitation/signal wire and contamination resistance. To measure the excitation/signal wire resistance by itself (i.e., independent of the contamination resistance), the switch 56 is set to positive polarity, which forward biases the probe diode 52. With such configuration, the DC current flows through excitation wire 22 and now flows directly through the forward bias probe diode 52, thereby bypassing the contamination resistance and continuing through the signal wire 24. In this manner, the DC source flow is not affected by the contamination resistance 34. The resulting DC current is now converted to a voltage by the I/V amplifier 26, which is used to determine the combined excitation/signal wire independent of the contamination resistance. A differential calculation then is made to isolate the contamination resistance from the wire resistance, and thus any variations in the wire resistance and/or contamination resistance is used as a correction factor in the final capacitance measurement for fuel gaging as described above in connection with the previous embodiment.

Referring additionally to FIG. 3 similarly as in connection with the previous embodiment, the capacitance probe 12 operates to differentiate the excitation waveform input signal into a square wave output current signal, but a slope error is introduced by the presence of fuel contamination. The measurement of the output signal waveform that includes the slope error is a direct indication of the level of contamination for all values of probe capacitance, assuming a fixed resistance for the wires. The output signal waveform is sent to the I-V converter 26, after which the slope error is compensated along a path that includes the slope detector 38 and the integrator 55 as described above. In addition, the compensation excitation waveform flows from the excitation generator 42 to the I-V converter 26, which applies the compensation excitation current waveform to the output signal waveform that flows from the signal resistance element 24. Due to the rising DC voltage of the contamination current, the compensation excitation waveform from the second excitation generator 42 will also continue to rise until the compensation excitation completely cancels the contamination current, flattening the slope of the output signal square waveform. Once the square wave output signal is de-sloped, the integration stops and the DC voltage is static. Both the output voltage and the capacitance value can be accurately measured based on the output of the amplitude sampler 28. Similarly as in the previous embodiment, a look-up table or a correction calculation may be used to apply a multiplier to compensate the measured capacitance to correct for the amplitude reduction in the compensated output signal relative to the initial output signal. Accordingly, once the contamination resistance is isolated from the wire measurement mode, and the slope correction flattens the square wave for capacitance measurement during the gaging mode, the measured capacitance is obtained and then corrected via entry into a look-up table or suitable calculation. This results in a final capacitance value, which in turn is associated with fuel gaging as to the amount of fuel in the fuel tank in the manner described above.

In an exemplary aircraft implementation, approximately twelve capacitance probes may be provided in each of the left and right wing tanks, and eight capacitance probes may be provided in the center tank. Density would be measured using two densitometers, one located in the center tank and one located in one of the wing tanks. It is reasonable to apply density measured in one wing tank and apply the density measurement to the other wing tank, since fuel would be from the same batch and the same temperature typically is present in both wing tanks. The center tank would most likely be at a different temperature and thus is provided with its own densitometer. Fuel dielectric compensation may be performed by compensators, one in each tank. A single fuel computer may be used to interface with all the fuel tanks (including separate tank compartments) and to the aircraft main or central computer system. The in-tank wiring (including the excitation, signal, and sensing wires) are high-resistance wires as described above, and any associated out-tank wiring may be regular wire. An exemplary aircraft component arrangement may be as follows.

| Component Type | Count |
| --- | --- |
| Fuel Computer | 1 |
| Refuel Panel | 1 |
| Probes in Center Tank | 8 |
| Probes in Wing Tanks | 24 (12 each wing tank) |
| Compensators | 3 |
| Densitometers | 2 |
| Temperature Sensors | 3 |
| Point Level Sensors | 5 |

Depending on integrity and availability requirements, the component count may be adjusted as suitable for any particular aircraft design or other circumstances.

An aspect of the invention, therefore, is an enhanced capacitive fuel gaging system, particularly suitable for use in an aircraft fuel system, that uses high-resistance elements to minimize electrical conduction into the fuel tanks, while also compensating for fuel contamination. In exemplary embodiments, a fuel gaging system includes a capacitance probe; a capacitance measurement circuit component comprising a first excitation generator, an excitation wire connected between the first excitation generator and the capacitance probe, and a signal wire connected to the capacitance probe with the capacitance probe being connected between the excitation wire and the signal wire, wherein the first excitation generator generates an input signal applied to the excitation wire and an output signal is read from the signal wire to determine a capacitance at the capacitance probe; a wire resistance measurement circuit component configured to isolate a contamination resistance to account for variations in wire resistance of the wires in determining the capacitance at the capacitance probe; and a contamination compensation circuit component configured to compensate for fuel contamination in determining the capacitance at the capacitance probe. The fuel gaging system may include one or more of the following features, either individually or in combination.

In an exemplary embodiment of the fuel gaging system, the system further includes a switching system that selectively engages the wire resistance measurement circuit component during a wire measurement mode, and selectively engages the contamination compensation circuit component during a fuel gaging mode.

In an exemplary embodiment of the fuel gaging system, the wire resistance measurement circuit component includes a direct current (DC) voltage source and a sensing wire connected between the DC voltage source and the capacitance probe.

In an exemplary embodiment of the fuel gaging system, the DC voltage source is a 50V DC voltage source.

In an exemplary embodiment of the fuel gaging system, the wire resistance measurement circuit component further includes a first switch connected between the DC voltage source and the signal wire, and the first switch is in a closed state during a wire measurement mode for isolating contamination resistance from resistance of the wires.

In an exemplary embodiment of the fuel gaging system, the wire resistance measurement circuit component further includes a measuring device connected to the excitation wire oppositely from the capacitance probe, wherein when the DC voltage source supplies a DC voltage to the sensing wire, the measuring device reads an output from the excitation wire.

In an exemplary embodiment of the fuel gaging system, the wire resistance measurement circuit component further includes a second switch connected between the excitation wire and the measuring device, and the second switch is in a closed state during a wire measurement mode for isolating contamination resistance from resistance of the wires.

In an exemplary embodiment of the fuel gaging system, the wire resistance measurement circuit component includes a direct current (DC) voltage source that is switchable between a positive polarity and a negative polarity, and a probe diode connected across the capacitance probe.

In an exemplary embodiment of the fuel gaging system, the DC voltage source is a 50V DC voltage source.

In an exemplary embodiment of the fuel gaging system, the wire resistance measurement circuit component further includes a first switch that is switchable between a first position to connect the excitation wire to the DC voltage source in the wire measurement mode, and a second position to connect the excitation wire to the first excitation generator in the fuel gaging mode.

In an exemplary embodiment of the fuel gaging system, the wire resistance measurement circuit component further includes a second switch that switches the DC voltage source between the positive polarity and the negative polarity In an exemplary embodiment of the fuel gaging system, the excitation wire and the signal wire are standard wires combined with safety resistors.

In an exemplary embodiment of the fuel gaging system, the excitation wire and the signal wire are high resistance wires having a 2 MΩ resistance.

In an exemplary embodiment of the fuel gaging system, the sensing wire is a 2 MΩ resistance wire.

In an exemplary embodiment of the fuel gaging system, the contamination compensation circuit component includes a slope sampler that samples an output signal from the signal wire, an inverter that inverts an output of the slope sampler, and a second excitation generator that generates a compensation excitation that compensates for a slope error in the output signal of the signal wire.

In an exemplary embodiment of the fuel gaging system, the system further includes an I-V converter connected to an output of the signal wire and an amplitude sampler connected to an output of the I-V converter for determining the capacitance at the capacitance probe.

In an exemplary embodiment of the fuel gaging system, the capacitance probe includes concentric outer and inner probes.

In an exemplary embodiment of the fuel gaging system, the capacitance probe is 1-meter long and has an outer diameter of 35 mm and an inner diameter of 19 mm.

Another aspect of the invention is an aircraft fuel system including a center fuel tank, a left wing fuel tank, and a right wing fuel tank; and each of the center fuel tank, left wing fuel tank, and right wing fuel tank includes one or more fuel gaging systems according to any of the embodiments. The aircraft fuel system may include eight capacitance probes in the center tank, twelve capacitance probes in the left wing fuel tank, and twelve capacitance probes in the right wing fuel tank. The aircraft fuel system further may include a fuel computer for determining fuel amount based on measurements from one or more of the fuel gaging systems. The aircraft fuel system further may include, for determining fuel density, a first densitometer located in the center fuel tank and a second densitometer located in one of the wing fuel tanks.

Another aspect of the invention is a method of gaging fuel in a capacitance fuel gaging system including a capacitance probe and high resistance elements through which an input signal is applied and from which an output signal is read. In exemplary embodiments. the method includes the steps of: operating in a fuel gaging mode comprising measuring a capacitance at the capacitance probe based on the output signal and calculating an amount of fuel based on the capacitance measurement; operating in a wire measurement mode to isolate contamination resistance from resistance of the wires to account for wire resistance variations in determining the capacitance at the capacitance probe; and wherein the fuel gaging mode further comprises compensating for fuel contamination by compensating an error in the output signal due to fuel contamination in determining the capacitance at the capacitance probe. The method of gaging fuel may include one or more of the following features, either individually or in combination.

In an exemplary embodiment of the method of gaging fuel, operating in the fuel gaging mode comprises: applying a first excitation signal through an excitation wire to the capacitance probe, wherein an output of the capacitance probe flows through a signal wire; measuring the output signal from the signal wire; determining the capacitance measurement at the capacitance probe based on the output signal from the signal wire; and calculating the fuel amount based on the capacitance measurement at the capacitance probe. Operating in the wire measurement mode comprises: applying a DC voltage source through a sensing wire to the capacitance probe; measuring an output from the signal wire in response to the DC voltage source and determining a wire resistance; measuring an output from the excitation wire in response to the DC voltage source and determining a combined wire resistance and contamination resistance of contamination in the fuel; and performing a differential calculation between the combined wire resistance and contamination resistance measurement and the wire resistance measurement to isolate the contamination resistance to account for variations in wire resistance in determining the capacitance measurement at the capacitance probe. Compensating for fuel contamination comprises: sampling the output signal from the signal wire and integrating the sampled output signal to generate a compensation output; transmitting the compensation output through an inverter to generate a contamination current; and applying a second excitation signal to the contamination current to compensate for the error in the output signal from the signal wire.

In an exemplary embodiment of the method of gaging fuel, operating in the wire measurement mode comprises: connecting a probe diode across the capacitance probe; applying a DC voltage source to the capacitance probe with the probe diode reverse biased; measuring an output from the signal wire in response to the DC voltage source with the probe diode reverse biased and determining a combined wire resistance and contamination resistance of contamination in the fuel; applying the DC voltage source to the capacitance probe with the probe diode forward biased; measuring an output from the signal wire in response to the DC voltage source with the probe diode forward biased and determining a wire resistance; and performing a differential calculation between the combined wire resistance and contamination resistance measurement and the wire resistance measurement to isolate the contamination resistance to account for variations in wire resistance in determining the capacitance measurement at the capacitance probe.

In an exemplary embodiment of the method of gaging fuel, the first excitation signal is a triangle waveform and the capacitance probe operates to differentiate the first excitation signal to output a square waveform output signal through the signal wire having a slope error indicative of fuel contamination; integrating the sampled output signal of the signal wire to generate a continuously rising DC voltage; and the second excitation signal is a triangle waveform 180° out of phase with the first excitation waveform and whose amplitude is based on a voltage associated with the contamination current to de-slope the slope error in the output signal of the signal wire.

In an exemplary embodiment of the method of gaging fuel, the method further includes applying a multiplier factor to the de-sloped output signal to correct for a reduction in amplitude of the de-sloped output signal relative to the output signal from the signal wire.

In an exemplary embodiment of the method of gaging fuel, the output signal of the signal wire is sampled at 25% and 75% points.

In an exemplary embodiment of the method of gaging fuel, measuring the capacitance at the capacitance probe further comprises, based on the contamination resistance measurement from the wire measurement mode and the compensated output signal of the signal wire, applying a multiplier factor to the capacitance measurement at the capacitance probe to calculate a final capacitance value for calculating the fuel amount.

In an exemplary embodiment of the method of gaging fuel, the multiplier factor is obtained from a stored look-up table.

In an exemplary embodiment of the method of gaging fuel, the first excitation signal has a frequency of 20 HZ and an amplitude of 100 Vpk-pk, and a sampling window for sampling the output signal from the signal wire is 25 ms.

In an exemplary embodiment of the method of gaging fuel, wherein calculating the fuel amount comprises: determining an immersed length of the capacitance probe within the fuel based on the capacitance measurement at the capacitance probe; obtaining a fuel surface attitude based on the immersed length and probe coordinates of the capacitance probe; and determining a nominal volume of fuel.

In an exemplary embodiment of the method of gaging fuel, the fuel is contained in a fuel tank of an aircraft, and calculating the fuel amount further comprises: applying a scale factor to the nominal volume based on probe placement; using the scaled nominal volume, fuel surface attitude, and weight on wheels of the aircraft, obtaining a volume correction factor from a stored polynomial based look-up table and applying the volume correction factor to the scaled nominal volume to determine actual fuel volume; and multiplying the actual fuel volume by a measured density to determine the fuel mass.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A fuel gaging system comprising:
   a capacitance probe;
   a capacitance measurement circuit component comprising a first excitation generator, an excitation wire connected between the first excitation generator and the capacitance probe, and a signal wire connected to the capacitance probe with the capacitance probe being connected between the excitation wire and the signal wire, wherein the first excitation generator generates an input signal applied to the excitation wire and an output signal is read from the signal wire to determine a capacitance at the capacitance probe;

a wire resistance measurement circuit component configured to isolate a contamination resistance to account for variations in wire resistance of the wires in determining the capacitance at the capacitance probe; and a contamination compensation circuit component configured to compensate for fuel contamination in determining the capacitance at the capacitance probe.

2. The fuel gaging system of claim 1, further comprising a switching system that selectively engages the wire resistance measurement circuit component during a wire measurement mode, and selectively engages the contamination compensation circuit component during a fuel gaging mode.

3. The fuel gaging system of claim 2, wherein the wire resistance measurement circuit component includes a direct current (DC) voltage source and a sensing wire connected between the DC voltage source and the capacitance probe.

4. The fuel gaging system of claim 3, wherein the wire resistance measurement circuit component further includes a first switch connected between the DC voltage source and the sensing wire, and the first switch is in a closed state during a wire measurement mode for isolating contamination resistance from resistance of the wires.

5. The fuel gaging system of claim 3, wherein the wire resistance measurement circuit component further includes a measuring device connected to the excitation wire oppositely from the capacitance probe, wherein when the DC voltage source supplies a DC voltage to the sensing wire, the measuring device reads an output from the excitation wire.

6. The fuel gaging system of claim 5, wherein the wire resistance measurement circuit component further includes a second switch connected between the excitation wire and the measuring device, and the second switch is in an open state during a wire measurement mode for isolating contamination resistance from resistance of the wires.

7. The fuel gaging system of claim 2, wherein the wire resistance measurement circuit component includes a direct current (DC) voltage source that is switchable between a positive polarity and a negative polarity, and a probe diode connected across the capacitance probe.

8. The fuel gaging system of claim 7, wherein the wire resistance measurement circuit component further includes a first switch that is switchable between a first position to connect the excitation wire to the DC voltage source in the wire measurement mode, and a second position to connect the excitation wire to the first excitation generator in the fuel gaging mode.

9. The fuel gaging system of claim 8, wherein the wire resistance measurement circuit component further includes a second switch that switches the DC voltage source between the positive polarity and the negative polarity.

10. The fuel gaging system of claim 1, wherein the excitation wire and the signal wire are standard wires combined with safety resistors.

11. The fuel gaging system of claim 1, wherein the excitation wire and the signal wire are high resistance wires having up to 2 MΩ resistance.

12. The fuel gaging system of claim 1, wherein the contamination compensation circuit component includes a slope sampler that samples an output signal from the signal wire, an inverter that inverts an output of the slope sampler, and a second excitation generator that generates a compensation excitation that compensates for a slope error in the output signal of the signal wire.

13. The fuel gaging system of claim 1, further comprising an I-V converter connected to an output of the signal wire and an amplitude sampler connected to an output of the I-V converter for determining the capacitance at the capacitance probe.

14. A method of gaging fuel in a capacitance fuel gaging system including a capacitance probe and high resistance elements through which an input signal is applied and from which an output signal is read, the method comprising the steps of:

operating in a fuel gaging mode comprising measuring a capacitance at the capacitance probe based on the output signal and calculating an amount of fuel based on the capacitance measurement;

operating in a wire measurement mode to isolate contamination resistance from resistance of the high resistance elements to account for resistance variations in determining the capacitance at the capacitance probe; and wherein the fuel gaging mode further comprises compensating for fuel contamination by compensating an error in the output signal due to fuel contamination in determining the capacitance at the capacitance probe.

15. The method of gaging fuel of claim 14, wherein the high resistance elements include an excitation wire and a signal wire, and operating in the fuel gaging mode comprises:

applying a first excitation signal through the excitation wire to the capacitance probe, wherein an output of the capacitance probe flows through the signal wire;

measuring the output signal from the signal wire;

determining the capacitance measurement at the capacitance probe based on the output signal from the signal wire; and calculating the fuel amount based on the capacitance measurement at the capacitance probe.

16. The method of gaging fuel of claim 14, wherein operating in the wire measurement mode comprises:

applying a DC voltage source through a sensing wire to the capacitance probe;

measuring an output from the signal wire in response to the DC voltage source and determining a wire resistance;

measuring an output from the excitation wire in response to the DC voltage source and determining a combined wire resistance and contamination resistance of contamination in the fuel; and performing a differential calculation between the combined wire resistance and contamination resistance measurement and the wire resistance measurement to isolate the contamination resistance to account for variations in wire resistance in determining the capacitance measurement at the capacitance probe; and wherein compensating for fuel contamination comprises:

sampling the output signal from the signal wire and integrating the sampled output signal to generate a compensation output;

transmitting the compensation output through an inverter to generate a contamination current; and applying a second excitation signal to the contamination current to compensate for the error in the output signal from the signal wire.

17. The method of gaging fuel of claim 14, wherein operating in the wire measurement mode comprises:

connecting a probe diode across the capacitance probe;

applying a DC voltage source to the capacitance probe with the probe diode reverse biased;

measuring an output from the signal wire in response to the DC voltage source with the probe diode reverse biased and determining a combined wire resistance and contamination resistance of contamination in the fuel;

applying the DC voltage source to the capacitance probe with the probe diode forward biased;

measuring an output from the signal wire in response to the DC voltage source with the probe diode forward biased and determining a wire resistance; and performing a differential calculation between the combined wire resistance and contamination resistance measurement and the wire resistance measurement to isolate the contamination resistance to account for variations in wire resistance in determining the capacitance measurement at the capacitance probe; and wherein compensating for fuel contamination comprises:

sampling the output signal from the signal wire and integrating the sampled output signal to generate a compensation output;

transmitting the compensation output through an inverter to generate a contamination current; and applying a second excitation signal to the contamination current to compensate for the error in the output signal from the signal wire.

18. The method of gaging fuel of claim 17, wherein:

the first excitation signal is a triangle waveform and the capacitance probe operates to differentiate the first excitation signal to output a square waveform output signal through the signal wire having a slope error indicative of fuel contamination;

integrating the sampled output signal of the signal wire to generate a continuously rising DC voltage; and the second excitation signal is a triangle waveform 180° out of phase with the first excitation waveform and whose amplitude is based on a voltage associated with the contamination current to de-slope the slope error in the output signal of the signal wire.

19. The method of gaging fuel of claim 14, wherein measuring the capacitance at the capacitance probe further comprises, based on the contamination resistance measurement from the wire measurement mode and the compensated output signal of the signal wire, applying a multiplier factor to the capacitance measurement at the capacitance probe to calculate a final capacitance value for calculating the fuel amount.

20. The method of gaging fuel of claim 14, wherein calculating the fuel amount comprises:

determining an immersed length of the capacitance probe within the fuel based on the capacitance measurement at the capacitance probe;

obtaining a fuel surface attitude based on the immersed length and probe coordinates of the capacitance probe; and determining a nominal volume of fuel.

\* \* \* \* \*